June 24, 1941.   D. M. BALDWIN   2,247,146
VESSEL FOR THE TRANSPORT OF VEHICLES
Original Filed Aug. 1, 1939   4 Sheets-Sheet 1

INVENTOR
Delavan M. Baldwin
BY
ATTORNEYS

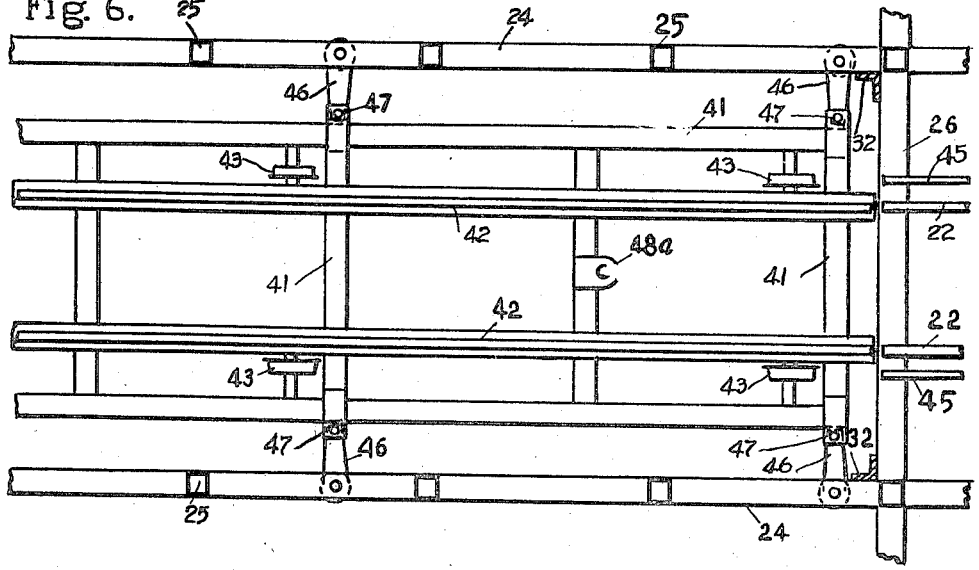
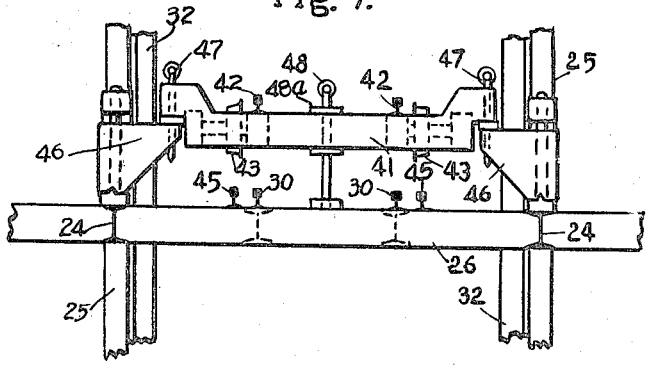
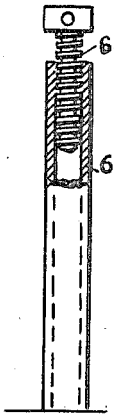

Patented June 24, 1941

2,247,146

UNITED STATES PATENT OFFICE 2,247,146

VESSEL FOR THE TRANSPORT OF VEHICLES

Delavan Munson Baldwin, New Canaan, Conn.

Continuation of application Serial No. 287,798, August 1, 1939. This application October 22, 1940, Serial No. 362,287

6 Claims. (Cl. 114—72)

This invention relates to the transportation of vehicles in vessels equipped with lifts and adapted for the loading of vehicles from ports or railway terminals or yards, the storage of said vehicles and the unloading thereof at the point of destination. The word "vehicle" is employed herein in its broadest sense as an instrument of conveyance however supported for movement, as for example, on wheels, runners, casters, or independent rollers. Examples of vehicles for which the invention is particularly adapted are railway cars, trucks, tractors, trailers, airplanes, Army and Navy mechanized equipment, low flat cars primarily for use in the transportation of "containers" between docks, railway terminals or yards and the vessels thereof.

One object of this invention is to provide a vessel for the transport of vehicles on a plurality of decks with power-operated lifts vertically guided in shaftways by which the vehicles loaded or empty can be transferred from one deck to another.

A further object is to provide supplementary platforms in the shaftways on which the vehicles can also be carried and this space thereby fully utilized for the load carried by the vessel.

A further object is to provide for the horizontal removal from the shaftways of such supplementary platforms so that they will not need to be hoisted when the lifts are carrying loads.

A further object is to provide for the support of the lifts and also of the supplementary platforms with their loads in the shaftways independently of each other and of the hoisting apparatus.

A further object is to provide supplemental platforms in the shaftways which may be attached to the undersides of the lifts by folding suspension rods for transferring loads between the main deck and the bottom deck.

A convenient though not essential form of vessel structure is in the provision of four loading decks. Where such structure is provided a further object of the invention is a construction in which the total travel required for the lifts in serving the four decks is approximately only twice the distance between decks so that the lengths of cables required and the capacity of the hoisting drums may be minimized.

A further object is to provide a vessel with the lifts suitably located and proportioned for the economical utilization of space by the vehicles to be transported.

A further object is to provide a vessel in which the hoisting apparatus is suitably located in relation to the power-generating and propulsion machinery so as to properly balance the vessel.

In the accompanying four sheets of drawings which form a part hereof, I have shown the invention in connection with railway freight cars and I have provided rails on the elevator platforms and decks of the vessel for the convenient movement, guidance and location of the railway cars on the platforms and decks of the vessel. It should be understood, however, that such showing is purely for the purpose of illustration and is not limitative upon the scope or character of this invention.

Fig. 6 is a plan view to a larger scale of a portion of a supplemental platform together with a portion of the shaftway in the upper part of which it is supported.

Fig. 7 is a transverse vertical section through the same.

Fig. 8 shows one of the posts for supporting the lift.

Figure 1:
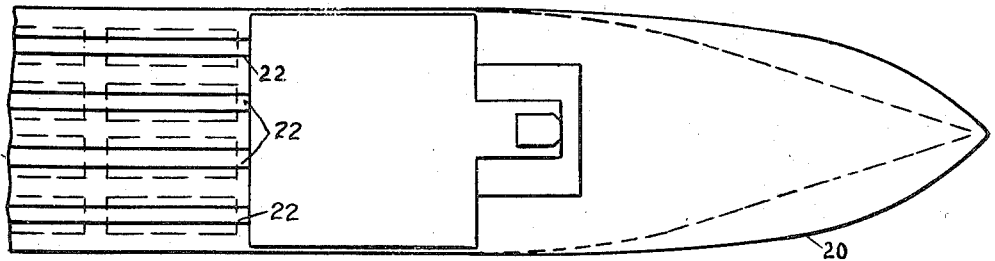
Figure 1 is a plan view of the forward end of a vessel which embodies this invention.
Figure 2:
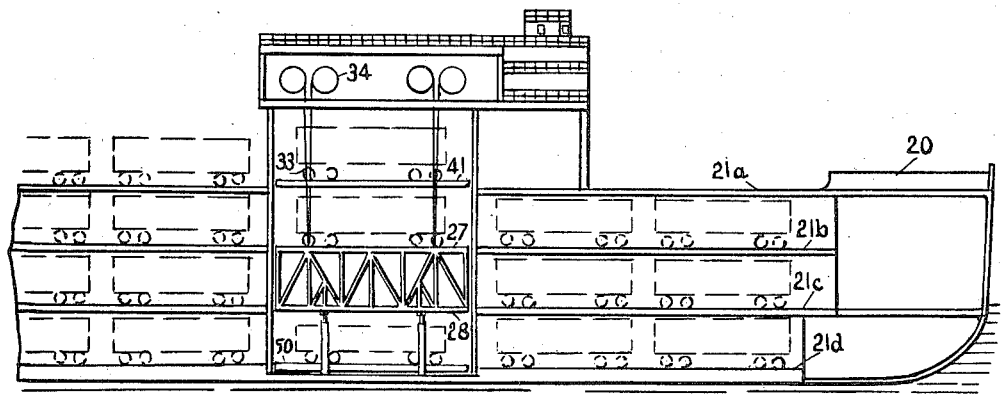
Fig. 2 is a vertical longitudinal section through the same.
Figure 3:
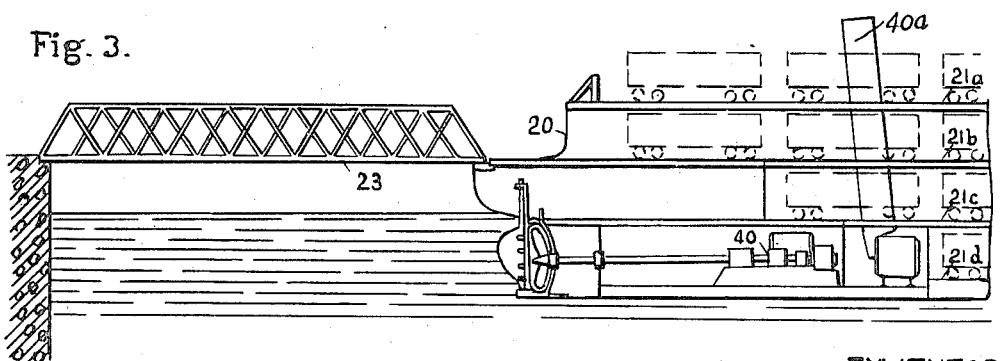
Fig. 3 is a vertical longitudinal section through the stern of the vessel together with the landing bridge.

A vessel 20, with a top or weather deck 21a, a main deck 21b, a between deck 21c, and a bottom or tank-top deck 21d, has four pairs of tracks 22 on each deck on which freight cars are shown. The cars are removed from and loaded on the vessel when docked over a bridge 23 leading from the dock and temporarily connected with the main deck at the stern. Longitudinal girders 24 afford longitudinal stiffness to the vessel. Stanchions 25 are set between the girders. Four shaftways are framed at each deck between the longitudinal girders and transverse girders 26 and are located in a transverse line back of where the hull commences to taper for the bow, so that deck space will be mainly aft, but forward there is space for eight cars on the main deck and for four cars on each of the two decks below.

In each shaftway is a lift consisting of an upper platform 27, a lower platform 28, and truss sides 29. The upper platform carries a pair of tracks 30 and the lower platform carries a pair of tracks 31. Vertical guides 32 for the lifts are in the corners of the shaftways. Cables 33 lead from each of the lifts to eight hoisting drums 34 located over each shaftway. The drums are driven from a motor 35 through suitable reduction gearing such as worm-gear speed reducers 36, spur pinions 37, and gears 38, formed with the drums. Brake drums 39 are also provided. The forward location of the weight of this hoisting apparatus serves to balance the vessel against the location at the stern of the propulsion machinery including the engines and accessory power plant 40. The stacks 40a are at the sides of the vessel.

In each shaftway in addition to the lift with its platforms, there is a supplemental platform 41, above the lift with a pair of tracks 42 on which a car is supported. This platform is narrower than the space between the guides so that it can be removed horizontally forward out of the shaftway and supported and stored on the main deck while the lift is being used in transferring cars between the main deck and the other decks. The platform has wheels 43 which ride on special rails 44 on the upper platform of the lift, and on special rails 45 on the main deck forward of the shaftway. Retractable supports 46 hinged between stanchions serve to support the platform in the shaftway independently of the lift. Dowel pins 47 keep the platform in place when so supported. When the lift is raised under this platform, and the support is transferred to the lift, and the retractable supports are swung out of the way, a dowel pin 49 carried by a suitable support 48a keeps the platform from shifting when so supported and it is being carried by the lift.

A second supplemental platform 50 in each shaftway with a pair of tracks 51 matches with the bottom deck. Folding supporting rods 52 hinged to the underside of the lift serve to connect with folding rods 53 hinged to the platform, in spaced relation, and when connected therewith hoist or lower it with a car thereon.

Posts 60 with screw jacks 61, so positioned as not to interfere with the supplemental platform 50, extend up from the bottom deck to support the lift with its platforms in matching relation with the main deck and the between deck to facilitate positioning and also to relieve the hoisting apparatus of the load. The jacks can be retracted to permit the lowering of the lift and bring the supplemental platform 41 carried on it into matching relation with the main deck in order to take off or load the car thereon which is carried in the hatchway.

The operation of unloading and loading is preferably as follows: Assuming that the vessel arrives in port with an incoming load of cars to be discharged and replaced with an outgoing load, the loads including four cars carried in each of the shaftways, it will be desirable to unload simultaneously at the two outer tracks and lifts. Also it will be desirable to unload simultaneously at the two middle tracks and lifts, and likewise as to loading, in order to avoid excessive listing of the vessel.

Figure 4:
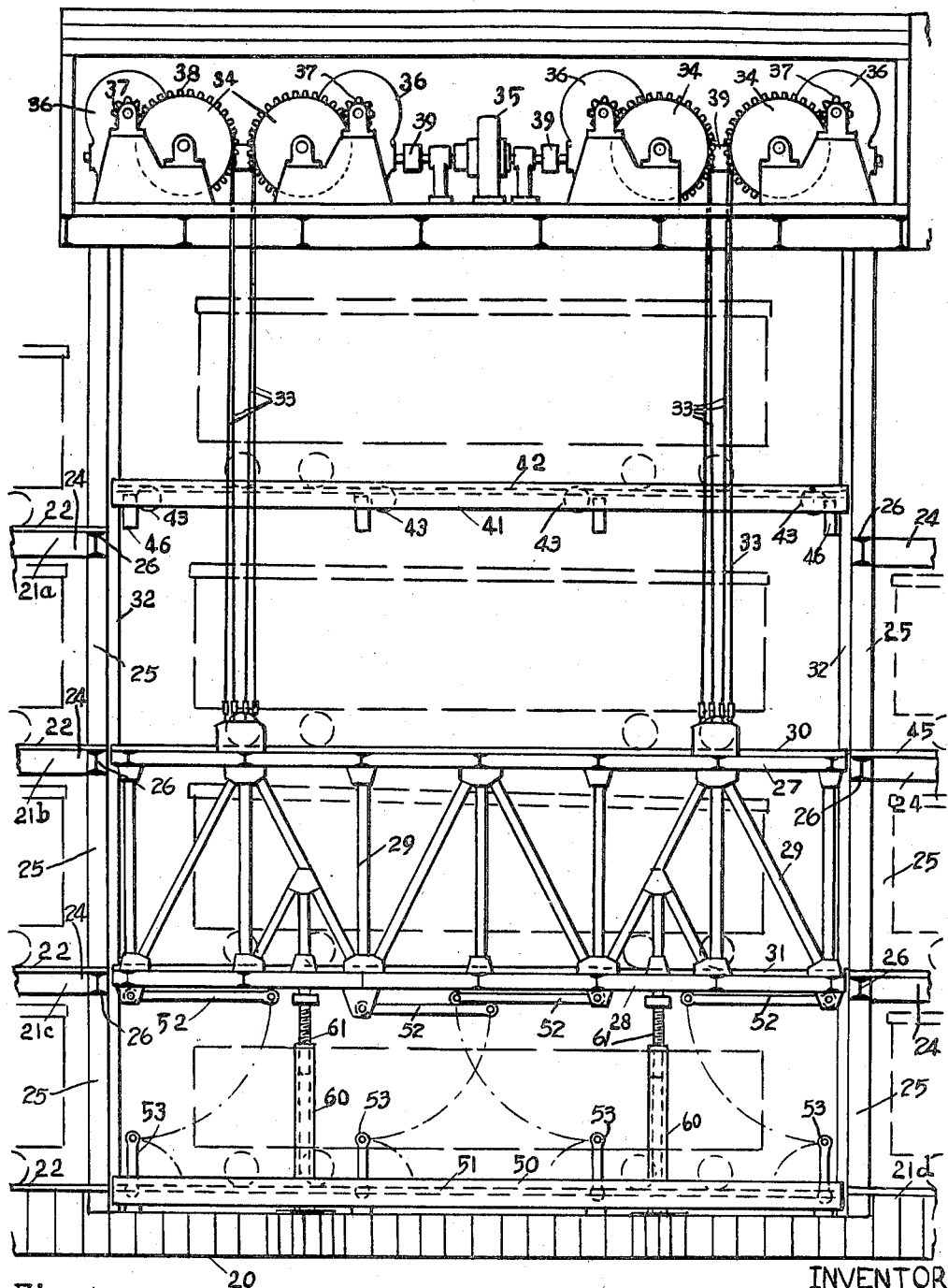
Fig. 4 is a vertical longitudinal section through a portion of the vessel including a shaftway with its lift, supplementary platforms and hoisting apparatus.
Figure 5:
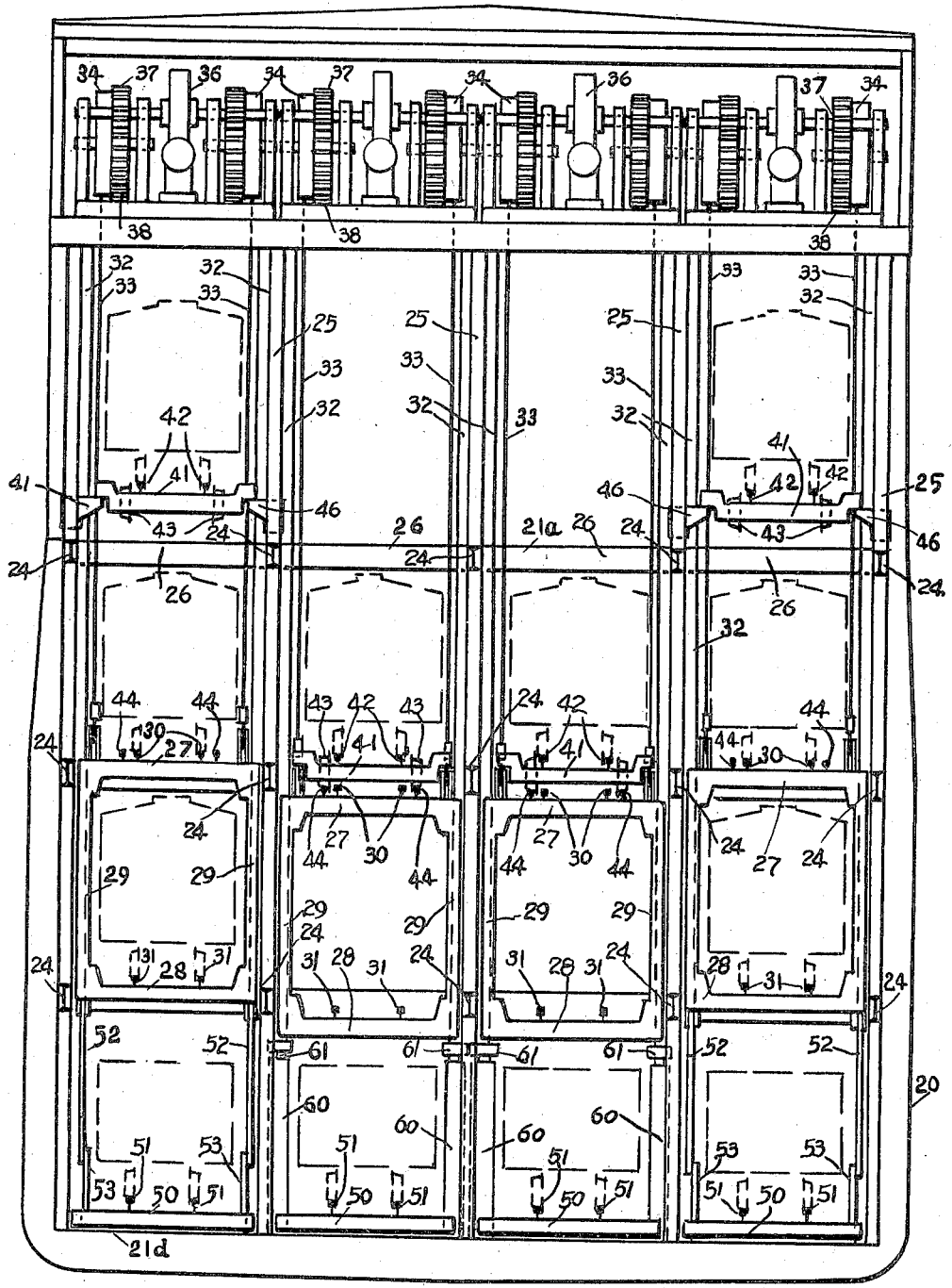
Fig. 5 is a vertical transverse section through the shaftways of the vessel looking forward.

A procedure which will keep to a minimum the load put upon the hoisting apparatus will now be described in relation to one of the lifts, starting with four cars in the shaftway as shown in Fig. 4. The cars on the tracks on the main deck leading to this lift and the car on the upper platform of the lift will be run off the vessel. The lift is next hoisted and the car on the lower platform of the lift is run off. The lift thus lightened is hoisted into contact with the supplemental platform 41 above it which is raised sufficiently to free it from the retractable supports 46 and these are swung out of the way. The jacks 61 on the posts 60 are lowered and this platform is lowered to the main deck, as shown in the middle shaftways Fig. 5, and the car thereon is run off. The lift is next hoisted sufficiently for the platform to be run off forward onto the main deck and stored while the lift is used to unload and load the cars on the top deck, the between deck, and the bottom deck, transferring them to the main deck in unloading and from the main deck in loading, which may be in any sequence. The cars on the bottom deck are transferred by the supplemental platform 50 which is then connected by the suspension rods to the underside of the lift, as shown in the side shaftways Fig. 5. Preferably after the cars in line on any of the said three decks (top, between and bottom) have been removed the line is filled with cars for the outgoing load before proceeding with further unloading so as to avoid too great a variation in the level of the vessel and excessive incline of the bridge leading thereto. On the completion of the reloading of the bottom deck the car to be stored on the supplemental platform 50 is run on to that platform and the platform lowered to its storage position and disconnected from the lift.

Assuming that the top and between decks have also been reloaded as above set forth the lift is then raised to place its lower platform 28 on a level with the main deck and the car to be stored on the said platform 28 run thereon. The lift is then lowered into position for receiving the supplemental platform 41 and this platform rolled in position onto the upper platform 27 of the lift and held in position thereon by means of the dowel pin 48. The car to be stored on the supplemental platform 41 is then run thereon and the platform raised to storage position as illustrated in the outer shaftways in Fig. 5. The retractable supports 46 are then swung into position to support the supplemental platform 41.

The jacks 61 are then raised into their normal supporting position for the lift and the lift is lowered in contact therewith, its upper platform 27 then being on a level with the main deck. The cars are then run onto the main deck forward of the lift, the car to be stored on the lift is run thereon and the deck to the rear of the lift is then filled with its storage cars.

This application is a continuation of my application Ser. No. 287,798, filed Aug. 1, 1939.

The foregoing detailed description has been given for clearness of understanding and no undue limitation should be inferred therefrom.

I claim:

1. In a vessel comprising a plurality of decks and a shaftway connecting the decks, the combination of means for supporting vehicles in the shaftway comprising a lift including a main platform, and a supplemental platform supported on the lift above the main platform for hoisting and lowering; mechanism for supporting the supplemental platform in the shaftway independently of the lift for vehicle storage; and hoisting mechanism embodying cables depending past the supplemental platform and connected to the lift for operating the lift while the supplemental platform is independently supported.

2. In a vessel comprising a plurality of decks and a shaftway connecting the decks, the combination of guides in the shaftway; means for supporting vehicles in the shaftway comprising a lift directed by the guides and including a main platform, and a supplemental platform narrower than the distance between the guides and movable out of and into the shaftway therebetween, said supplemental platform being supported on the lift above the main platform for hoisting and lowering; mechanism for supporting the supplemental platform in the shaftway independently of the lift for vehicle storage; and hoisting mechanism embodying cables depending past the supplemental platform and connected to the lift for operating the lift while the supplemental platform is independently supported.

3. In a vessel comprising a plurality of decks including a main deck from which vehicles can be directly loaded and unloaded from the vessel, a deck above the main deck and one or more decks below the main deck, and a shaftway connecting the decks, the combination of means for supporting vehicles in the shaftway comprising a lift embodying two main platforms fixedly connected therewith, and a supplemental platform supported on the lift above the main platforms for hoisting and lowering; mechanism for supporting the supplemental platform in the shaftway independently of the lift for vehicle storage and above the upper main platform when the lower main platform is in line with the main deck; and hoisting mechanism embodying cables depending past the supplemental platform and connected to the lift for operating the lift while the supplemental platform is independently supported.

4. In a vessel comprising a plurality of decks and a shaftway connecting the decks, the combination of means for supporting vehicles in the shaftway comprising a lift including a main platform, a supplemental platform supported on the lift above the main platform for hoisting and lowering, and a second supplemental platform suspended from the lift below the main platform for hoisting and lowering and detachable therefrom for vehicle storage; mechanism for supporting the first supplemental platform in the shaftway independently of the lift for vehicle storage; and hoisting mechanism embodying cables depending past the first supplemental platform and connected to the lift for operating the lift while the first supplemental platform is independently supported and the second supplemental platform is detached from the lift.

5. In a vessel comprising a plurality of decks equally spaced apart and a shaftway connecting the decks, the combination of means for supporting vehicles in the shaftway comprising a lift embodying two main platforms fixedly connected therewith and spaced apart a distance substantially equal to the distance between the decks, a supplemental platform supported on the lift above the main platforms for hoisting and lowering, and a second supplemental platform suspended from the lift below the main platforms for hoisting and lowering and detachable therefrom for vehicle storage; mechanism for supporting the first supplemental platform in the shaftway independently of the lift for vehicle storage; and hoisting mechanism embodying cables depending past the first supplemental platform and connected to the lift for operating the lift while the first supplemental platform is independently supported and the second supplemenal platform is detached from the lift.

6. In a multiple deck vessel including a main deck from which vehicles can be directly loaded and unloaded from the vessel, a deck above the main deck and a plurality of decks below the main deck, said decks being equally spaced apart, and a shaftway connecting the decks, the combination of guides in the shaftway; means for supporting vehicles in the shaftway comprising a lift directed by the guides and embodying two main platforms fixedly connected to the lift and spaced apart a distance substantially equal to the distance between the decks, a supplemental platform narrower than the distance between the guides and movable out of and into the shaftway therebetween, said supplemental platform being supported on the lift above the main platforms for hoisting and lowering, and a second supplemental platform suspended from the lift below the main platforms for hoisting and lowering and detachable therefrom for vehicle storage; mechanism for suporting the first supplemental platform in the shaftway independently of the lift for vehicle storage; and hoisting mechanism embodying cables depending past the first supplemental platform and connected to the lift for operating the lift while the first supplemental platform is independently supported and the second supplemental platform is detached from the lift.

DELAVAN MUNSON BALDWIN.